US011670306B2

(12) United States Patent
Tsukagoshi

(10) Patent No.: US 11,670,306 B2
(45) Date of Patent: Jun. 6, 2023

(54) TRANSMISSION DEVICE, TRANSMISSION METHOD, RECEPTION DEVICE AND RECEPTION METHOD

(71) Applicant: SONY CORPORATION, Tokyo (JP)

(72) Inventor: Ikuo Tsukagoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/505,782

(22) PCT Filed: Aug. 31, 2015

(86) PCT No.: PCT/JP2015/074593
§ 371 (c)(1),
(2) Date: Feb. 22, 2017

(87) PCT Pub. No.: WO2016/035731
PCT Pub. Date: Mar. 10, 2016

(65) Prior Publication Data

US 2017/0249944 A1 Aug. 31, 2017

(30) Foreign Application Priority Data

Sep. 4, 2014 (JP) ............................ JP2014-180592

(51) Int. Cl.
*G06F 17/00* (2019.01)
*G10L 19/008* (2013.01)
*G10L 19/00* (2013.01)

(52) U.S. Cl.
CPC ............ *G10L 19/008* (2013.01); *G10L 19/00* (2013.01)

(58) Field of Classification Search
CPC .............................. G10L 19/00; G10L 19/008
(Continued)

(56) References Cited

U.S. PATENT DOCUMENTS 7,512,322 B2 * 3/2009 Seo ........................ G11B 20/12 345/629
8,332,059 B2 * 12/2012 Herre .................... G10L 19/008 370/350
(Continued)

FOREIGN PATENT DOCUMENTS

CN 103650535 A 3/2014
CN 103843330 A 6/2014
(Continued)

OTHER PUBLICATIONS

ISO/IEC JTC1/SC29/WG11 N14459, "Text of ISO/IEC 23008-3/CD, 3D audio" (Year: 2014).*
(Continued)

*Primary Examiner* — Paul C McCord
(74) *Attorney, Agent, or Firm* — Oblon, McClelland, Maier & Neustadt, L.L.P.

(57) ABSTRACT

A processing load of a reception side is reduced when a plurality of types of audio data is transmitted. A predetermined format container is transmitted having a predetermined number of audio streams including a plurality of group encoded data. For example, the plurality of group encoded data includes either or both of channel encoded data and object encoded data. Attribute information indicating an attribute of each of the plurality of group encoded data is inserted into a layer of the container. For example, stream correspondence information indicating an audio stream including each of the plurality of group encoded data is further inserted into the layer of the container.

19 Claims, 16 Drawing Sheets

3Daudio_stream_config_descriptor

| Syntax | No. of Bits | Format |
|---|---|---|
| 3Daudio_stream_config_descriptor(){ | | |
| descriptor_tag | 8 | uimsbf |
| descriptor_length | 8 | uimsbf |
| NumOfGroups, N | 8 | uimsbf |
| NumOfPresetGroups, P | 8 | uimsbf |
| for (i = 0 ; i < N ; i++){ | | |
| groupID | 8 | uimsbf |
| attribute_of_groupID | 8 | uimsbf |
| SwitchGroupID | 8 | uimsbf |
| audio_substreamID | 8 | uimsbf |
| } | | |
| for (j = 0 ; j < P ; j++){ | | |
| presetGroupID | 8 | uimsbf |
| NumOfGroups_in_preset, R | 8 | uimsbf |
| for (k = 0 ; k < R ; k++){ | | |
| groupID | 8 | uimsbf |
| } | | |
| } | | |
| } | | |

(58) Field of Classification Search
USPC .............................................................. 700/94
See application file for complete search history.

(56) References Cited

U.S. PATENT DOCUMENTS

| | | | | |
|---|---|---|---|---|
| 8,588,947 | B2 * | 11/2013 | Oh | H04M 3/568 369/4 |
| 8,639,368 | B2 * | 1/2014 | Oh | G10L 19/008 700/94 |
| 8,745,502 | B2 * | 6/2014 | Snibbe | G06Q 10/10 235/383 |
| 9,178,535 | B2 * | 11/2015 | Luby | H03M 13/27 |
| 9,319,014 | B2 * | 4/2016 | Oh | H03G 3/00 |
| 9,661,145 | B2 * | 5/2017 | Gilg | H04M 3/56 |
| 2006/0174267 | A1 * | 8/2006 | Schmidt | H04S 3/008 725/39 |
| 2010/0008647 | A1 * | 1/2010 | Isobe | G11B 27/329 386/337 |
| 2010/0017002 | A1 * | 1/2010 | Oh | G10L 19/008 700/94 |
| 2010/0017003 | A1 * | 1/2010 | Oh | G10L 19/008 700/94 |
| 2011/0015770 | A1 * | 1/2011 | Seo | G10L 19/008 700/94 |
| 2011/0099579 | A1 * | 4/2011 | Kim | H04N 21/235 725/44 |
| 2012/0030253 | A1 * | 2/2012 | Katsumata | H04N 9/79 707/804 |
| 2012/0081516 | A1 * | 4/2012 | Tsukagoshi | H04N 21/236 348/43 |
| 2012/0293618 | A1 * | 11/2012 | Tsukagoshi | H04N 13/0059 348/43 |
| 2014/0029502 | A1 * | 1/2014 | Hong | H04N 21/2389 370/312 |
| 2014/0232823 | A1 | 8/2014 | Tsukagoshi | |
| 2014/0328405 | A1 * | 11/2014 | Shen | H04N 19/597 375/240.16 |
| 2014/0375889 | A1 * | 12/2014 | Cho | H04N 5/268 348/706 |
| 2015/0058908 | A1 * | 2/2015 | Ko | H04N 21/2383 725/116 |
| 2016/0204887 | A1 * | 7/2016 | Lee | H04L 65/602 375/295 |
| 2017/0223429 | A1 * | 8/2017 | Schreiner | G10L 19/00 |

FOREIGN PATENT DOCUMENTS

| | | | |
|---|---|---|---|
| EP | 2 768 225 | A1 | 8/2014 |
| JP | 2000-181448 | | 6/2000 |
| JP | 2002-199336 | A | 7/2002 |
| JP | 2008-199528 | A | 8/2008 |
| JP | 2011-234336 | | 11/2011 |
| JP | 2012-033243 | A | 2/2012 |
| JP | 2012-523764 | | 10/2012 |
| JP | 2014-520491 | A | 8/2014 |
| WO | 2004/066303 | A1 | 8/2004 |
| WO | 2004066303 | A1 | 8/2004 |
| WO | WO-2005076622 | A1 | 8/2005 |

OTHER PUBLICATIONS

ISO/IEC JTC1/SC29/WG11 MPEG2014/M33224 (Year: 2014).*

Extended European Search Report dated Feb. 16, 2018 in Patent Application No. 15838724.1.

"MPEG Transport Stream", http://en.wikipedia.org/w/index.php?title=MPEG_transport_stream&oldid=374152729, XP055010297A, Jul. 2010, 8 pages.

Stephan Schreiner, et al., "On Multiple MPEG-H 3D Audio Streams", International Organisation for Standardisation, Organisation Internationale De Normalisation, ISO/IEC JTC1/SC29/WG11, Coding of Moving Pictures and Audio, MPEG2014/M34266, XP030062639A, Jul. 2014, 6 pages.

Japanese Office Action dated Oct. 8, 2019 in Japanese Patent Application No. 2016-546628.

Chinese Office Action issued in 201580045713.2 dated Jan. 15, 2020.

"Information Technology—High Efficiency Coding and Media Delivery in Heterogeneous Environments—Part 3: 3D Audio"; ISO/IEC DIS 23008-3; ISO/IEC/JTC 1/SC 29: Jul. 25, 2014; XP030021482; 435 pages.

* cited by examiner

FIG. 6

| groupID | attribute | switchGroupID | presetGroupID [1] | presetGroupID [2] | subStreamID |
|---|---|---|---|---|---|
| 1 | Channel data | 0 | 1 | 1 | 1 |
| 2 | Object sound | 0 | 2 | 2 | 2 |
| 3 | Object language1 | 1 | 3 | | 3 |
| 4 | Object language2 | 1 | | 4 | 3 |

FIG. 8

| groupID | attribute | switchGroupID | presetGroupID [1] | presetGroupID [2] | subStreamID |
|---|---|---|---|---|---|
| 1 | Channel data | 0 | 1 | 1 | 1 |
| 2 | Object sound | 0 | 2 | 2 | 1 |
| 3 | Object language1 | 1 | 3 | | 2 |
| 4 | Object language2 | 1 | | 4 | 2 |

FIG. 10

3Daudio_stream_config_descriptor

| Syntax | No. of Bits | Format |
|---|---|---|
| 3Daudio_stream_config_descriptor(){ | | |
| descriptor_tag | 8 | uimsbf |
| descriptor_length | 8 | uimsbf |
| NumOfGroups, N | 8 | uimsbf |
| NumOfPresetGroups, P | 8 | uimsbf |
| for (i = 0 ; i < N ; i++){ | | |
| groupID | 8 | uimsbf |
| attribute_of_groupID | 8 | uimsbf |
| SwitchGroupID | 8 | uimsbf |
| audio_substreamID | 8 | uimsbf |
| } | | |
| for (j = 0 ; j < P ; j++){ | | |
| presetGroupID | 8 | uimsbf |
| NumOfGroups_in_preset, R | 8 | uimsbf |
| for (k = 0 ; k < R ; k++){ | | |
| groupID | 8 | uimsbf |
| } | | |
| } | | |
| } | | |

FIG. 11

Semantics of 3Daudio_stream_config_descriptor

NumOfGroups (8bits)
INDICATE NUMBER OF Groups. (VALUE OF ONE OR MORE)
NumOfPresetGroups (8bits)
INDICATE NUMBER OF PresetGroups. (VALUE OF ONE OR MORE)
groupID (8bits)
INDICATE group IDENTIFIER. (VALUE OTHER THAN ZERO)
attribute_of_groupID (8bits)
INDICATE ATTRIBUTE OF ENCODED DATA OF THE group. (VALUE OTHER THAN ZERO)
switchGroupID (8bits)
IDENTIFIER INDICATING switchGroup TO WHICH THE group BELONGS.
'0' DOES NOT BELONG TO ANY switchGroup.
OTHER THAN '0' INDICATE switchGroup TO BE CAUSED TO BELONG TO.
audio_substreamID (8bits)
AUDIO SUB STREAM IDENTIFIER.
presetGroupID (8bits)
IDENTIFIER INDICATING BUNDLE PRESETTING Group.
NumOfGroups_in_preset (8bits)
INDICATE NUMBER OF Groups BELONGING TO presetGroup.

FIG. 12(a)

3Daudio_substreamID_descriptor

| Syntax | No. of Bits | Format |
|---|---|---|
| 3Daudio_substreamID_descriptor(){ | | |
| descriptor_tag | 8 | uimsbf |
| descriptor_length | 8 | uimsbf |
| audio_substreamID | 8 | uimsbf |
| } | | |

FIG. 12(b)

audio_substreamID (8bits)
AUDIO SUB STREAM IDENTIFIER.

TRANSMISSION DEVICE, TRANSMISSION METHOD, RECEPTION DEVICE AND RECEPTION METHOD

CROSS REFERENCE TO RELATED APPLICATIONS

This application is a U.S. National Phase of International Patent Application No PCT/JP2015/074593 filed on Aug. 31, 2015, which claims priority benefit of Japanese Patent Application No. JP 2014-180592 filed in the Japan Patent Office on Sep. 4, 2014. Each of the above-referenced applications is hereby incorporated herein by reference in its entirety.

TECHNICAL FIELD

The present technology relates to a transmission device, a transmission method, a reception device, and a reception method, and in particular relates to a transmission device and the like for transmitting a plurality of types of audio data.

BACKGROUND ART

Conventionally, as a stereoscopic (3D) acoustic technology, a technology has been devised for performing rendering by mapping encoded sample data to a speaker existing at an arbitrary position on the basis of metadata, (for example, see Patent Document 1).

CITATION LIST

Patent Document

Patent Document 1: Japanese Patent Application National Publication (Laid-Open) No. 2014-520491

SUMMARY OF THE INVENTION

Problems to be Solved by the Invention

It can be considered that object encoded data consisting of the encoded sample data and metadata is transmitted together with channel encoded data of 5.1 channels, 7.1 channels, and the like, and acoustic reproduction with enhanced realistic feeling can be achieved at a reception side.

An object of the present technology is to reduce a processing load of the reception side when a plurality of types of audio data is transmitted.

Solutions to Problems

A concept of the present technology lies in a transmission device including:

a transmission unit for transmitting a predetermined format container having a predetermined number of audio streams including a plurality of group encoded data; and an information insertion unit for inserting attribute information indicating an attribute of each of the plurality of group encoded data, into a layer of the container.

In the present technology, the predetermined format container having the predetermined number of audio streams including the plurality of group encoded data is transmitted by the transmission unit. For example, the plurality of group encoded data may include either or both of channel encoded data and object encoded data.

The attribute information indicating the attribute of each of the plurality of group encoded data is inserted into the layer of the container by the information insertion unit. For example, the container may be a transport stream (MPEG-2 TS) adopted in a digital broadcasting standard. In addition, for example, the container may be a container of MP4 used in internet delivery and the like, or of another format.

As described above, in the present technology, the attribute information indicating the attribute of each of the plurality of group encoded data included in the predetermined number of audio streams is inserted into the layer of the container. For that reason, at the reception side, the attribute of each of the plurality of group encoded data can be easily recognized before decoding of the encoded data, and only the necessary group encoded data can be selectively decoded to be used, and the processing load can be reduced.

Incidentally, in the present technology, for example, the information insertion unit may further insert stream correspondence information indicating an audio stream including each of the plurality of group encoded data, into the layer of the container. In this case, for example, the container may be an MPEG2-TS, and the information insertion unit may insert the attribute information and the stream correspondence information into an audio elementary stream loop corresponding to any one audio stream of the predetermined number of audio streams existing under a program map table. As described above, the stream correspondence information is inserted into the layer of the container, whereby the audio stream including the necessary group encoded data can be easily recognized, and the processing load can be reduced at the reception side.

For example, the stream correspondence information may be information indicating a correspondence between a group identifier for identifying each of the plurality of group encoded data and a stream identifier for identifying a stream of each of the predetermined number of audio streams. In this case, for example, the information insertion unit may further insert stream identifier information indicating a stream identifier of each of the predetermined number of audio streams, into the layer of the container. For example, the container may be an MPEG2-TS, and the information insertion unit may insert the stream identifier information into an audio elementary stream loop corresponding to each of the predetermined number of audio streams existing under the program map table.

In addition, for example, the stream correspondence information may be information indicating a correspondence between the group identifier for identifying each of the plurality of group encoded data and a packet identifier to be attached during packetizing of each of the predetermined number of audio streams. In addition, for example, the stream correspondence information may be information indicating a correspondence between the group identifier for identifying each of the plurality of group encoded data and type information indicating a stream type of each of the predetermined number of audio streams.

In addition, another concept of the present technology lies in a reception device including:

a reception unit for receiving a predetermined format container having a predetermined number of audio streams including a plurality of group encoded data, attribute information indicating an attribute of each of the plurality of group encoded data being inserted into a layer of the container; and a processing unit for processing the predetermined number of audio streams included in the container received, on the basis of the attribute information.

In the present technology, the predetermined format container having the predetermined number of audio streams including the plurality of group encoded data is received by the reception unit. For example, the plurality of group encoded data may include either or both of channel encoded data and object encoded data. The attribute information indicating the attribute of each of the plurality of group encoded data is inserted into the layer of the container. The predetermined number of audio streams included in the container received is processed on the basis of the attribute information, by the processing unit.

As described above, in the present technology, processing is performed of the predetermined number of audio streams included in the container received on the basis of the attribute information indicating the attribute of each of the plurality of group encoded data inserted into the layer of the container. For that reason, only the necessary group encoded data can be selectively decoded to be used, and the processing load can be reduced.

Incidentally, in the present technology, for example, stream correspondence information indicating an audio stream including each of the plurality of group encoded data may be further inserted into the layer of the container, and the processing unit may process the predetermined number of audio streams on the basis of the stream correspondence information besides the attribute information. In this case, the audio stream including the necessary group encoded data can be easily recognized, and the processing load can be reduced.

In addition, in the present technology, for example, the processing unit may selectively perform decoding processing to an audio stream including group encoded data holding an attribute conforming to a speaker configuration and user selection information, on the basis of the attribute information and the stream correspondence information.

In addition, yet another concept of the present technology lies in a reception device including:

a reception unit for receiving a predetermined format container having a predetermined number of audio streams including a plurality of group encoded data, attribute information indicating an attribute of each of the plurality of group encoded data being inserted into a layer of the container;

a processing unit for selectively acquiring predetermined group encoded data on the basis of the attribute information from the predetermined number of audio streams included in the container received, and reconfiguring an audio stream including the predetermined group encoded data; and a stream transmission unit for transmitting the audio stream reconfigured in the processing unit to an external device.

In the present technology, the predetermined format container having the predetermined number of audio streams including the plurality of group encoded data is received by the reception unit. The attribute information indicating the attribute of each of the plurality of group encoded data is inserted into the layer of the container. The predetermined group encoded data is selectively acquired on the basis of the attribute information from the predetermined number of audio streams, by the processing unit, and the audio stream including the predetermined group encoded data is reconfigured. Then, the audio stream reconfigured is transmitted to the external device, by the stream transmission unit.

As described above, in the present technology, on the basis of the attribute information indicating the attribute of each of the plurality of group encoded data inserted into the layer of the container, the predetermined group encoded data is selectively acquired from the predetermined number of audio streams, and the audio stream to be transmitted to the external device is reconfigured. The necessary group encoded data can be easily acquired, and the processing load can be reduced.

Incidentally, in the present technology, for example, stream correspondence information indicating an audio stream including each of the plurality of group encoded data may be further inserted into the layer of the container, and the processing unit may selectively acquire the predetermined group encoded data from the predetermined number of audio streams on the basis of the stream correspondence information, besides the attribute information. In this case, the audio stream including the predetermined group encoded data can be easily recognized, and the processing load can be reduced.

Effects of the Invention

According to the present technology, the processing load of the reception side can be reduced when the plurality of types of audio data is transmitted. Incidentally, the advantageous effects described in this specification are merely examples, and the advantageous effects of the present technology are not limited to them and may include additional effects.

BRIEF DESCRIPTION OF DRAWINGS

FIG. 6 is a diagram showing a correspondence between a group and a sub stream in the group division example (three divisions), and the like.

FIG. 8 is a diagram showing a correspondence between a group and a sub stream in the group division example (two divisions), and the like.

FIG. 10 is a diagram showing a structural example of a 3D audio stream configuration descriptor.

FIG. 11 is a diagram showing details of main information in the structural example of the 3D audio stream configuration descriptor.

FIGS. 12(*a*) and 12(*b*) are diagrams respectively showing a structural example of a 3D audio sub stream ID descriptor, and a detail of main information in the structural example.

MODES FOR CARRYING OUT THE INVENTION

The following is a description of a mode for carrying out the invention (the mode will be hereinafter referred to as the "embodiment"). Incidentally, explanation will be made in the following order.

1. Embodiment
2. Modification

1. Embodiment

[Example Configuration of a Transmission/Reception System]

Figure 1:
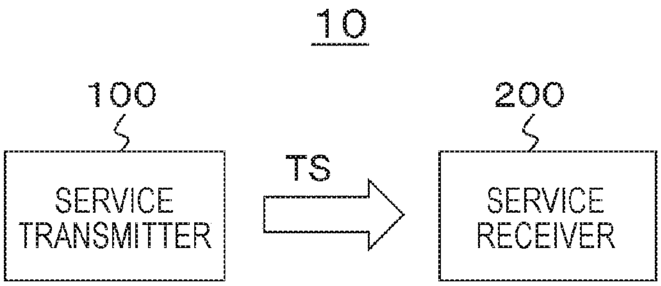
FIG. 1 is a block diagram showing an example configuration of a transmission/reception system as an embodiment.

FIG. 1 shows an example configuration of a transmission/reception system 10 as an embodiment. The transmission/reception system 10 is configured by a service transmitter 100 and a service receiver 200. The service transmitter 100 transmits a transport stream TS loaded on a broadcast wave or a network packet. The transport stream TS has a video stream, and a predetermined number of audio streams including a plurality of group encoded data.

Figure 2:
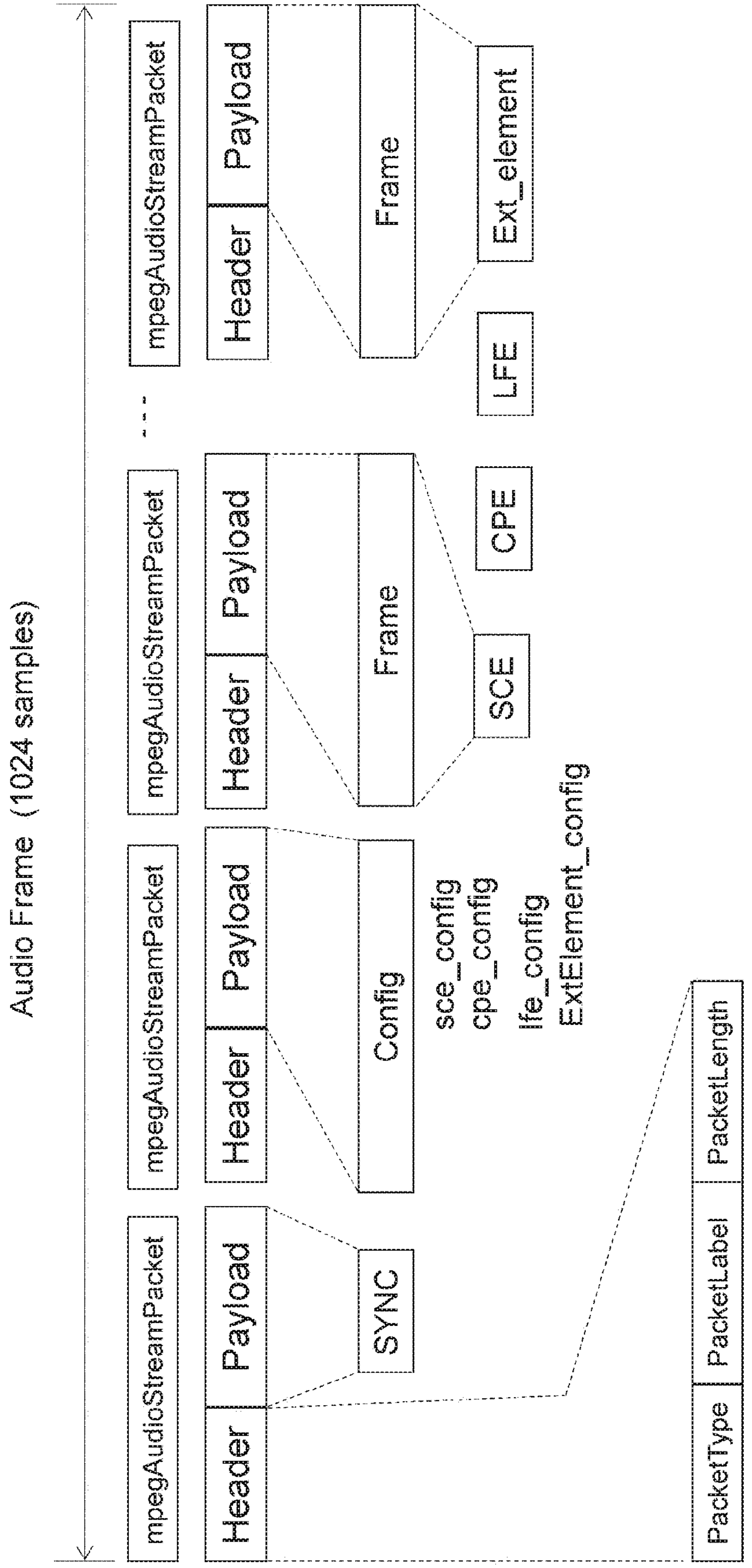
FIG. 2 is a diagram showing a structure of an audio frame (1024 samples) in 3D audio transmission data.

FIG. 2 shows a structure of an audio frame (1024 samples) in 3D audio transmission data dealt with in the embodiment. The audio frame consists of multiple MPEG audio stream packets (mpeg Audio Stream Packets). Each of the MPEG audio stream packets is configured by a header (Header) and a payload (Payload).

The header holds information, such as a packet type (Packet Type), a packet label (Packet Label), and a packet length (Packet Length). Information defined by the packet type of the header is disposed in the payload. In the payload information, there exist "SYNC" information corresponding to a synchronization start code, "Frame" information being actual data of the 3D audio transmission data, and "Config" information indicating a configuration of the "Frame" information.

The "Frame" information includes object encoded data and channel encoded data configuring the 3D audio transmission data. Here, the channel encoded data is configured by encoded sample data such as a Single Channel Element (SCE), a Channel Pair Element (CPE), and a Low Frequency Element (LFE). In addition, the object encoded data is configured by the encoded sample data of the Single Channel Element (SCE), and metadata for performing rendering by mapping the encoded sample data to a speaker existing at an arbitrary position. The metadata is included as an extension element (Ext_element).

Figure 3:
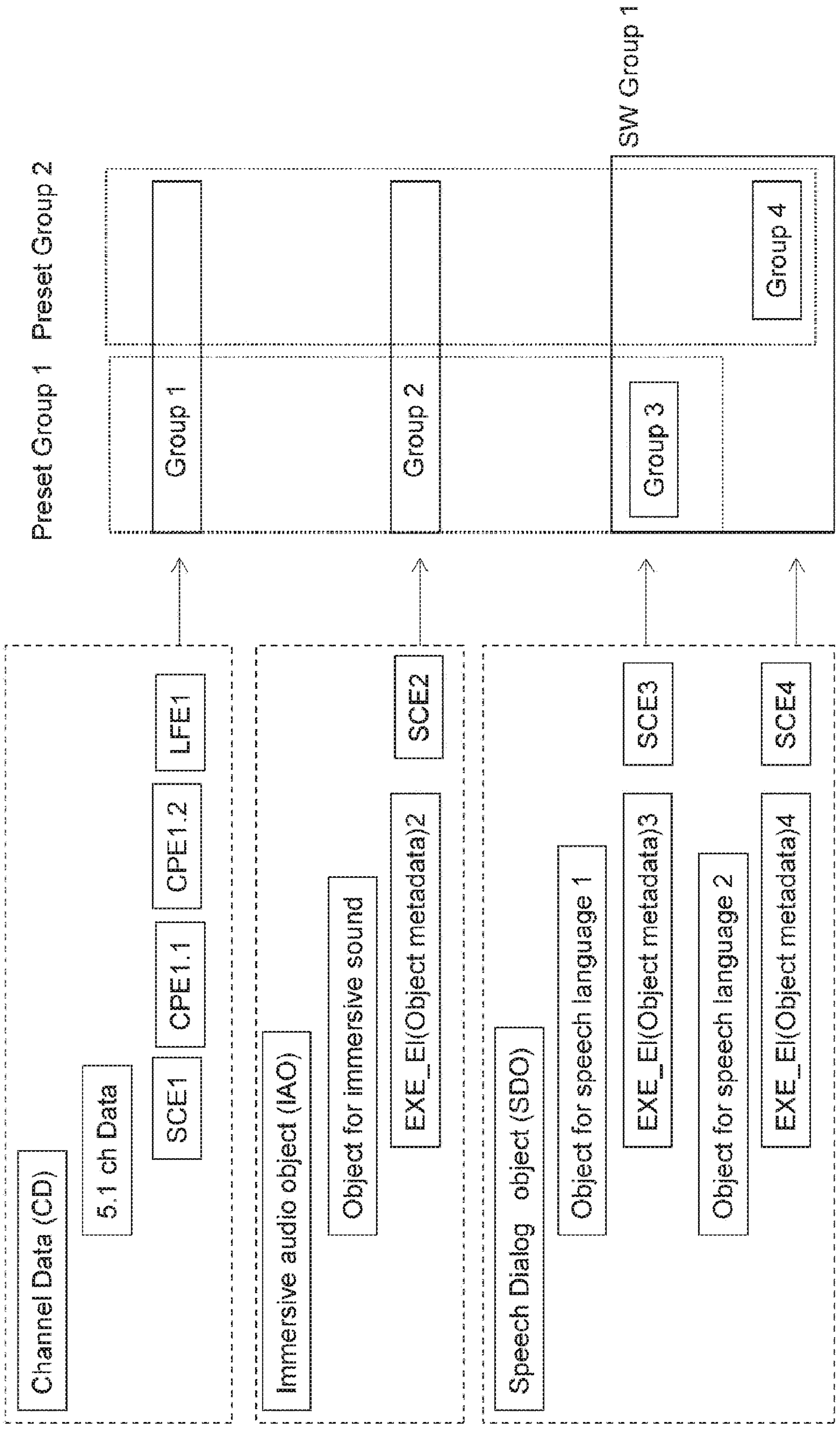
FIG. 3 is a diagram showing an example configuration of the 3D audio transmission data.

FIG. 3 shows an example configuration of the 3D audio transmission data. This example consists of one channel encoded data and two object encoded data. The one channel encoded data is channel encoded data (CD) of 5.1 channels, and consists of encoded sample data of SCE1, CPE1.1, CPE1.2, LFE1.

The two object encoded data are immersive audio object (Immersive audio object: IAO) encoded data and speech dialog object (Speech Dialog object: SDO) encoded data. The immersive audio object encoded data is object encoded data for an immersive sound, and consists of encoded sample data SCE2, and metadata EXE_El (Object metadata) 2 for performing rendering by mapping the encoded sample data to the speaker existing at the arbitrary position.

The speech dialog object encoded data is object encoded data for a speech language. In this example, speech dialog object encoded data exist respectively corresponding to language 1 and language 2. The speech dialog object encoded data corresponding to the language 1 consists of encoded sample data SCE3, and metadata EXE_El (Object metadata) 3 for performing rendering by mapping the encoded sample data to the speaker existing at the arbitrary position. In addition, the speech dialog object encoded data corresponding to the language 2 consists of encoded sample data SCE4, and metadata EXE El (Object metadata) 4 for performing rendering by mapping the encoded sample data to the speaker existing at the arbitrary position.

The encoded data is distinguished by a concept of a group (Group) by type. In the example shown, the encoded channel data of 5.1 channels is in a group 1, the immersive audio object encoded data is in a group 2, the speech dialog object encoded data of the language 1 is in a group 3, and the speech dialog object encoded data of the language 2 is in a group 4.

In addition, the data that can be selected between the groups at a reception side is registered with a switch group (SW Group) and encoded. In addition, the groups can be bundled into a preset group (preset Group), and can be reproduced according to a use case. In the example shown, the group 1, the group 2, and the group 3 are bundled into a preset group 1, and the group 1, the group 2, and the group 4 are bundled into a preset group 2.

Returning to FIG. 1, the service transmitter 100 transmits the 3D audio transmission data including the plurality of group encoded data in one stream, or multiple streams (Multiple stream), as described above.

Figure 4:
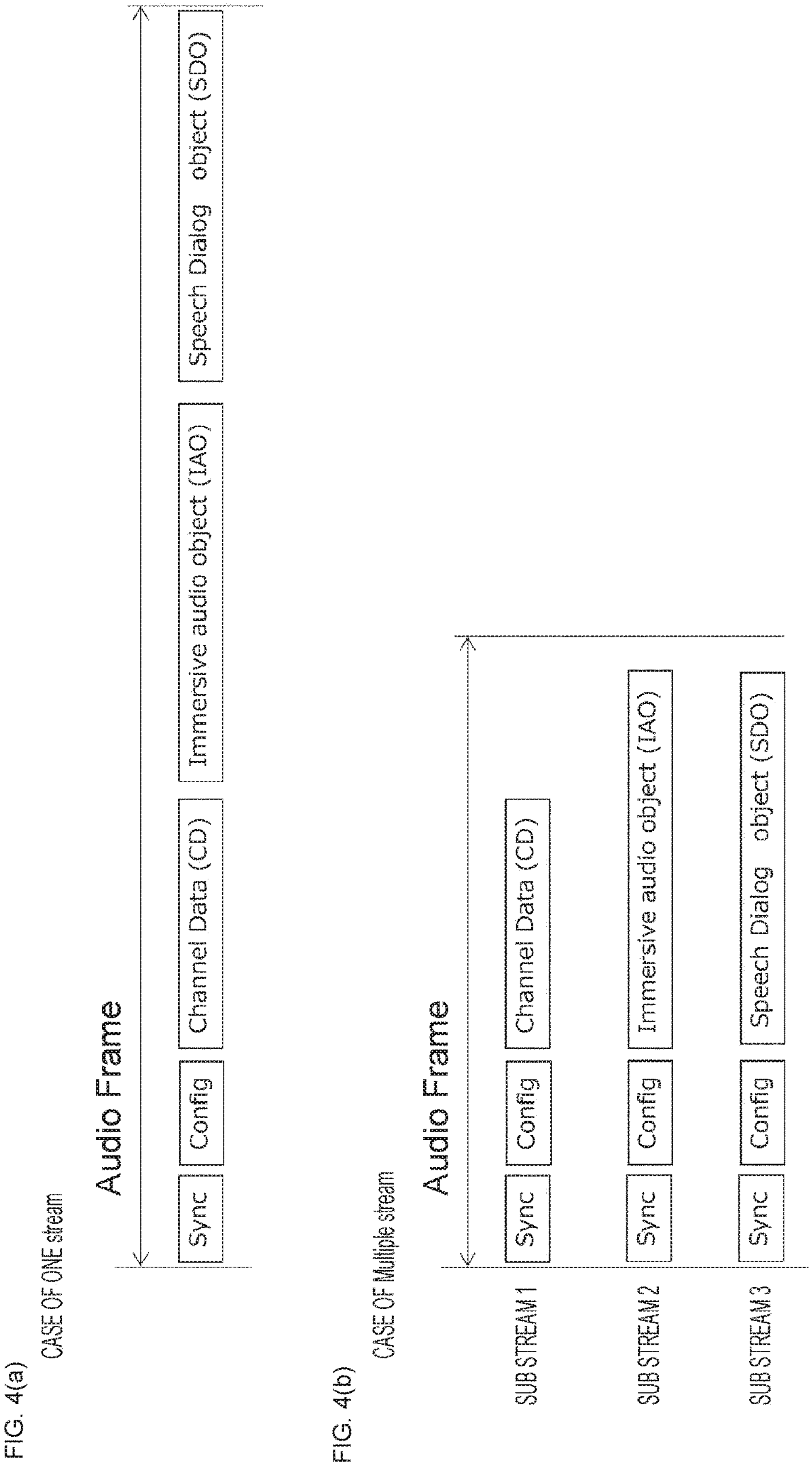
FIGS. 4(*a*) and 4(*b*) are diagrams schematically showing example configurations of the audio frame when transmission of the 3D audio transmission data is performed in one stream, and when the transmission is performed in multiple streams, respectively.

FIG. 4(*a*) schematically shows an example configuration of the audio frame when transmission is performed in one stream in the example configuration of the 3D audio transmission data of FIG. 3. In this case, the one stream includes the channel encoded data (CD), the immersive audio object encoded data (IAO), and the speech dialog object encoded data (SDO), together with the "SYNC" information and the "Config" information.

FIG. 4(*b*) schematically shows an example configuration of the audio frame when the transmission is performed in multiple streams (each of the streams is referred to as "sub stream," if appropriate), here three streams, in the example configuration of the 3D audio transmission data of FIG. 3. In this case, a sub stream 1 includes the channel encoded data (CD), together with the "SYNC" information and the "Config" information. In addition, a sub stream 2 includes the immersive audio object encoded data (IAO), together with the "SYNC" information and the "Config" information. Further, a sub stream 3 includes the speech dialog object encoded data (SDO), together with the "SYNC" information and the "Config" information.

Figure 5:
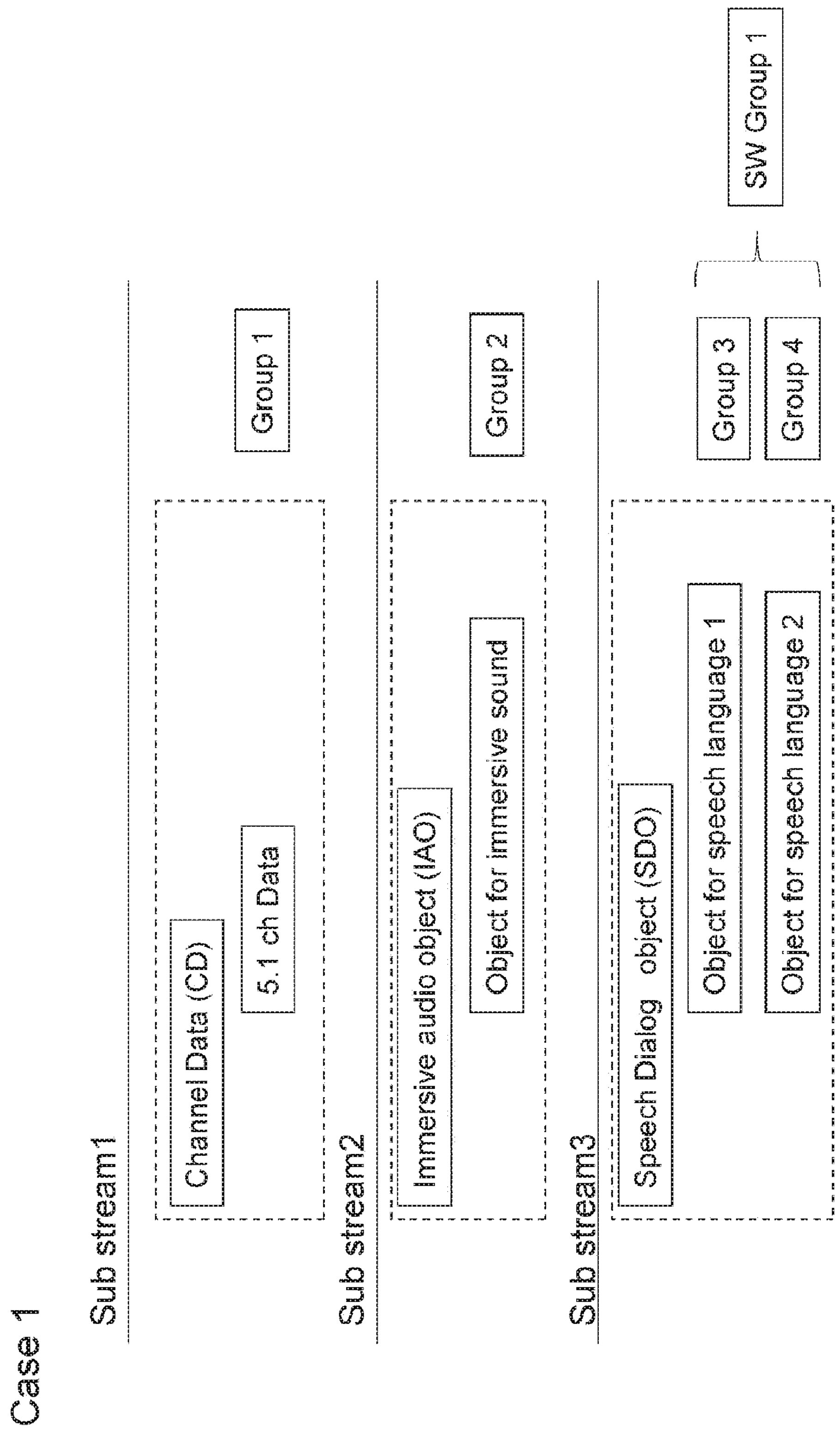
FIG. 5 is a diagram showing a group division example when the transmission is performed in three streams in the example configuration of the 3D audio transmission data.

FIG. 5 shows a group division example when the transmission is performed in three streams in the example configuration of the 3D audio transmission data of FIG. 3. In this case, the sub stream 1 includes the channel encoded data (CD) distinguished as the group 1. In addition, the sub stream 2 includes the immersive audio object encoded data (IAO) distinguished as the group 2. In addition, the sub stream 3 includes the speech dialog object encoded data (SDO) of the language 1 distinguished as the group 3, and the speech dialog object encoded data (SDO) of the language 2 distinguished as the group 4.

FIG. 6 shows a correspondence between a group and a sub stream in the group division example (three divisions) of FIG. 5, and the like. Here, a group ID (group ID) is an identifier for identifying the group. An attribute (attribute) indicates an attribute of each of the group encoded data. A switch group ID (switch Group ID) is an identifier for identifying the switching group. A preset group ID (preset Group ID) is an identifier for identifying the preset group. A sub stream ID (sub Stream ID) is an identifier for identifying the sub stream.

The shown correspondence indicates that the encoded data belonging to the group 1 is the channel encoded data, does not configure the switch group, and is included in the sub stream 1. In addition, the shown correspondence indicates that the encoded data belonging to the group 2 is the object encoded data (immersive audio object encoded data) for the immersive sound, does not configure the switch group, and is included in the sub stream 2.

In addition, the shown correspondence indicates that the encoded data belonging to the group 3 is the object encoded data (speech dialog object encoded data) for the speech language of the language 1, configures the switch group 1, and is included in the sub stream 3. In addition, the shown correspondence indicates that the encoded data belonging to the group 4 is the object encoded data (speech dialog object encoded data) for the speech language of the language 2, configures the switch group 1, and is included in the sub stream 3.

In addition, the shown correspondence indicates that the preset group 1 includes the group 1, the group 2, and the group 3. Further, the shown correspondence indicates that the preset group 2 includes the group 1, the group 2, and the group 4.

Figure 7:
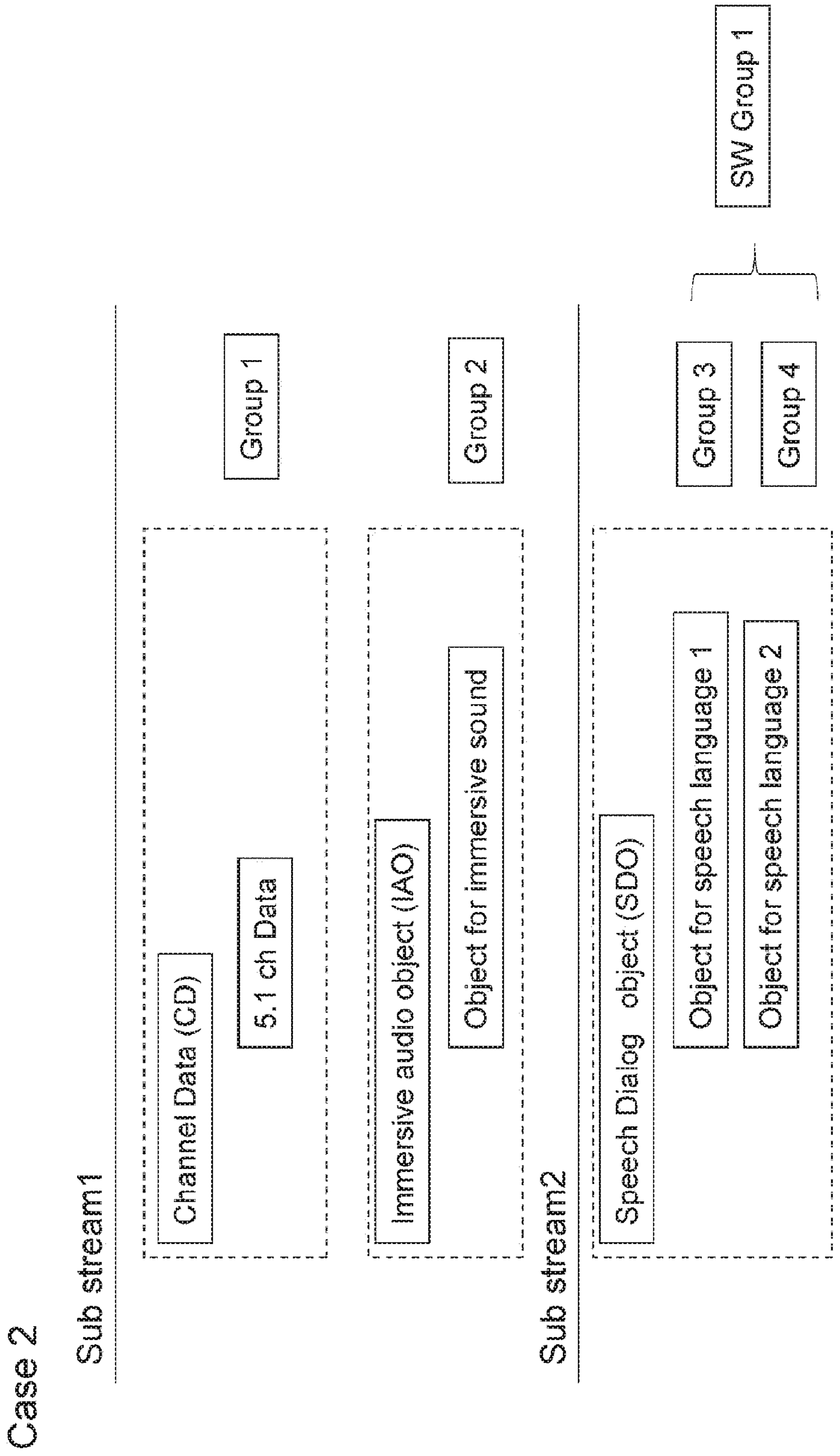
FIG. 7 is a diagram showing a group division example in which the transmission is performed in two streams in the example configuration of the 3D audio transmission data.

FIG. 7 shows a group division example in which the transmission is performed in two streams in the example configuration of the 3D audio transmission data of FIG. 3. In this case, the sub stream 1 includes the channel encoded data (CD) distinguished as the group 1, and the immersive audio object encoded data (IAO) distinguished as the group 2. In addition, the sub stream 2 includes the speech dialog object encoded data (SDO) of the language 1 distinguished as the group 3, and the speech dialog object encoded data (SDO) of the language 2 distinguished as the group 4.

FIG. 8 shows a correspondence between a group and a sub stream in the group division example (two divisions) of FIG. 7, and the like. The shown correspondence indicates that the encoded data belonging to the group 1 is the channel encoded data, does not configure the switch group, and is included in the sub stream 1. In addition, the shown correspondence indicates that the encoded data belonging to the group 2 is the object encoded data (immersive audio object encoded data) for the immersive sound, does not configure the switch group, and is included in the sub stream 1.

In addition, the shown correspondence indicates that the encoded data belonging to the group 3 is the object encoded data (speech dialog object encoded data) for the speech language of the language 1, configures the switch group 1, and is included in the sub stream 2. In addition, the shown correspondence indicates that the encoded data belonging to the group 4 is the object encoded data (speech dialog object encoded data) for the speech language of the language 2, configures the switch group 1, and is included in the sub stream 2.

In addition, the shown correspondence indicates that the preset group 1 includes the group 1, the group 2, and the group 3. Further, the shown correspondence indicates that the preset group 2 includes the group 1, the group 2, and the group 4.

Returning to FIG. 1, the service transmitter 100 inserts attribute information indicating an attribute of each of the plurality of group encoded data included in the 3D audio transmission data, into a layer of the container. In addition, the service transmitter 100 inserts stream correspondence information indicating an audio stream including each of the plurality of group encoded data, into the layer of the container. In the embodiment, the stream correspondence information is, for example, information indicating a correspondence between a group ID and a stream identifier.

The service transmitter 100 inserts these attribute information and stream correspondence information as a descriptor in, for example, any one audio stream of the predetermined number of audio streams existing under a program map table (Program Map Table: PMT), for example, an audio elementary stream loop corresponding to the most basic stream.

In addition, the service transmitter 100 inserts stream identifier information indicating a stream identifier indicating a stream identifier of each of the predetermined number of audio streams, into the layer of the container. The service transmitter 100 inserts the stream identifier information as a descriptor into an audio elementary stream loop corresponding to each of the predetermined number of audio streams existing under the program map table (Program Map Table: PMT), for example.

The service receiver 200 receives the transport stream TS loaded on the broadcast wave or the network packet and transmitted from the service transmitter 100. The transport stream TS has the predetermined number of audio streams including the plurality of group encoded data configuring the 3D audio transmission data, besides the video stream, as described above. Then, into the layer of the container, the attribute information indicating the attribute of each of the plurality of group encoded data included in the 3D audio transmission data is inserted, and the stream correspondence information indicating the audio stream including each of the plurality of group encoded data is inserted.

The service receiver 200 selectively performs decoding processing to an audio stream including group encoded data holding an attribute conforming to a speaker configuration and user selection information, on the basis of the attribute information and the stream correspondence information, and obtains an audio output of the 3D audio.

[Stream Generation Unit of Service Transmitter]

Figure 9:
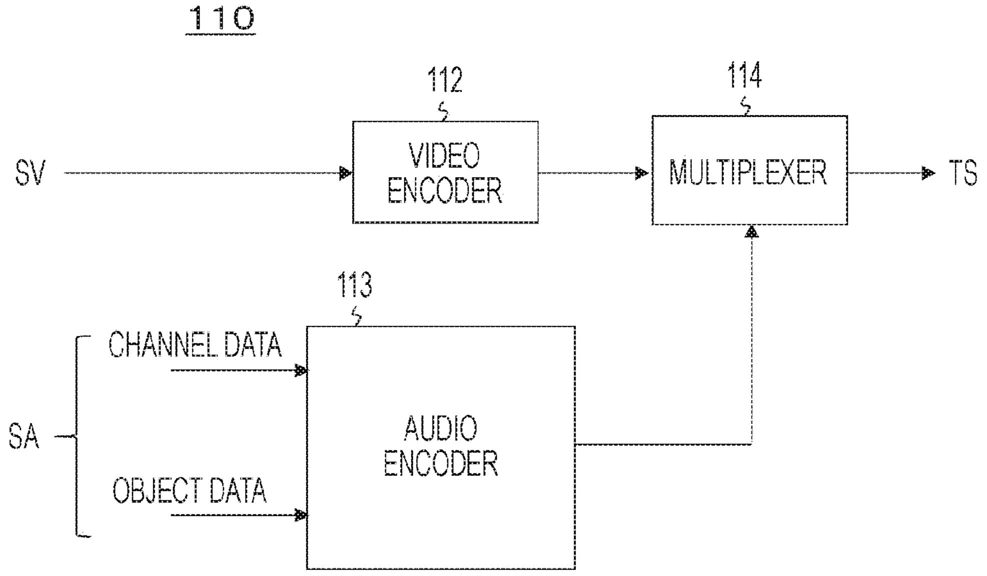
FIG. 9 is a block diagram showing an example configuration of a stream generation unit included in a service transmitter.

FIG. 9 shows an example configuration of a stream generation unit 110 included in the service transmitter 100. The stream generation unit 110 has a video encoder 112, an audio encoder 113, and a multiplexer 114. Here, an example is assumed in which audio transmission data consists of one encoded channel data and two object encoded data as shown in FIG. 3.

The video encoder 112 inputs video data SV, and performs encoding to the video data SV to generate a video stream (video elementary stream). The audio encoder 113 inputs the channel data and the immersive audio and speech dialog object data, as audio data SA.

The audio encoder 113 performs encoding to the audio data SA, and obtains the 3D audio transmission data. The 3D audio transmission data includes the channel encoded data (CD), the immersive audio object encoded data (IAO), and the speech dialog object encoded data (SDO), as shown in FIG. 3. Then, the audio encoder 113 generates one or multiple audio streams (audio elementary streams) including the plurality of, here four, group encoded data (see FIGS. 4(*a*), 4(*b*)).

The multiplexer 114 packetizes each of the video stream output from the video encoder 112 and the predetermined number of audio streams output from the audio encoder 113, into a PES packet, and further into a transport packet to multiplex the streams, and obtains the transport stream TS as a multiplexed stream.

In addition, the multiplexer 114 inserts the attribute information indicating the attribute of each of the plurality of group encoded data, and the stream correspondence information indicating the audio stream including each of the plurality of group encoded data, under the program map table (PMT). The multiplexer 114 inserts these pieces of information into, for example, an audio elementary stream loop corresponding to the most basic stream, by using a 3D audio stream configuration descriptor (3Daudio_stream_config_descriptor). The descriptor will be described later in detail.

In addition, the multiplexer 114 inserts the stream identifier information indicating the stream identifier of each of the predetermined number of audio streams, under the program map table (PMT). The multiplexer 114 inserts the information into an audio elementary stream loop corresponding to each of the predetermined number of audio streams, by using a 3D audio sub stream ID descriptor (3Daudio_substreamID_descriptor). The descriptor will be described later in detail.

Operation of the stream generation unit 110 shown in FIG. 9 is now briefly described. The video data is supplied to the video encoder 112. In the video encoder 112, encoding is performed to the video data SV, and a video stream including encoded video data is generated. The video stream is supplied to the multiplexer 114.

The audio data SA is supplied to the audio encoder 113. The audio data SA includes the channel data, and the immersive audio and speech dialog object data. In the audio encoder 113, encoding is performed to the audio data SA, and the 3D audio transmission data is obtained.

The 3D audio transmission data includes the immersive audio object encoded data (IAO), and the speech dialog object encoded data (SDO), besides the channel encoded data (CD) (see FIG. 3). Then, in the audio encoder 113, the one or multiple audio streams including four group encoded data are generated (see FIGS. 4(*a*), 4(*b*)).

The video stream generated by the video encoder 112 is supplied to the multiplexer 114. In addition, the audio stream generated by the audio encoder 113 is supplied to the multiplexer 114. In the multiplexer 114, the stream supplied from each encoder is packetized into the PES packet, and further into the transport packet to be multiplexed, and the transport stream TS is obtained as the multiplexed stream.

In addition, in the multiplexer 114, the 3D audio stream configuration descriptor is inserted into, for example, the audio elementary stream loop corresponding to the most basic stream. The descriptor includes the attribute information indicating the attribute of each of the plurality of group encoded data, and the stream correspondence information indicating the audio stream including each of the plurality of group encoded data.

In addition, in the multiplexer 114, the 3D audio sub stream ID descriptor is inserted into the audio elementary stream loop corresponding to each of the predetermined number of audio streams. The descriptor includes the stream identifier information indicating the stream identifier of each of the predetermined number of audio streams.

[Details of 3D audio Stream Configuration Descriptor]

FIG. 10 shows a structural example (Syntax) of the 3D audio stream configuration descriptor (3Daudio_stream_config_descriptor). In addition, FIG. 11 shows details of main information (Semantics) in the structural example.

An eight bit field of a "descriptor_tag" indicates a descriptor type. Here, it is indicated that the descriptor is the 3D audio stream configuration descriptor. An eight bit field of a "descriptor_length" indicates a length (size) of the descriptor, and indicates the number of subsequent bytes as the length of the descriptor.

An eight bit field of a "NumOfGroups, N" indicates the number of groups. An eight bit field of a "NumOfPresetGroups, P" indicates the number of preset groups. An eight bit field of a "groupID," an eight bit field of an "attribute_of_groupID," an eight bit field of a "SwitchGroupID," and an eight bit field of an "audio_substreamID" are repeated by the number of groups.

The field of the "groupID" indicates a group identifier. The field of the "attribute_of_groupID" indicates an attribute of the group encoded data. The field of the "SwitchGroupID" is an identifier indicating a switch group to which the group belongs. "0" indicates that the group does not belong to any switch group. Other than "0" indicates a switch group to be caused to belong. The "audio_substreamID" is an identifier indicating an audio sub stream including the group.

In addition, an eight bit field of a "presetGroupID" and an eight bit field of a "NumOfGroups_in_preset, R" are repeated by the number of preset groups. The field of the "presetGroupID" is an identifier indicating a bundle presetting a group. The field of the "NumOfGroups_in_preset, R" indicates the number of groups belonging to the preset group. Then, for each preset group, the eight bit field of the "groupID" is repeated by the number of groups belonging to the preset group, and the group belonging to the preset group is indicated. The descriptor may be disposed under an extended descriptor.

[Details of 3D Audio Sub stream ID Descriptor]

FIG. 12(*a*) shows a structural example (Syntax) of a 3D audio sub stream ID descriptor (3Daudio_substreamID_descriptor). In addition, FIG. 12(*b*) shows a detail of main information (Semantics) in the structural example.

An eight bit field of a "descriptor_tag" indicates a descriptor type. Here, it is indicated that the descriptor is the 3D audio sub stream ID descriptor. An eight bit field of a "descriptor_length" indicates a length (size) of the descriptor, and indicates the number of subsequent bytes as the length of the descriptor. An eight bit field of an "audio_substreamID" indicates an audio sub stream identifier. The descriptor may be disposed under an extended descriptor.

[Configuration of Transport Stream TS]

Figure 13:
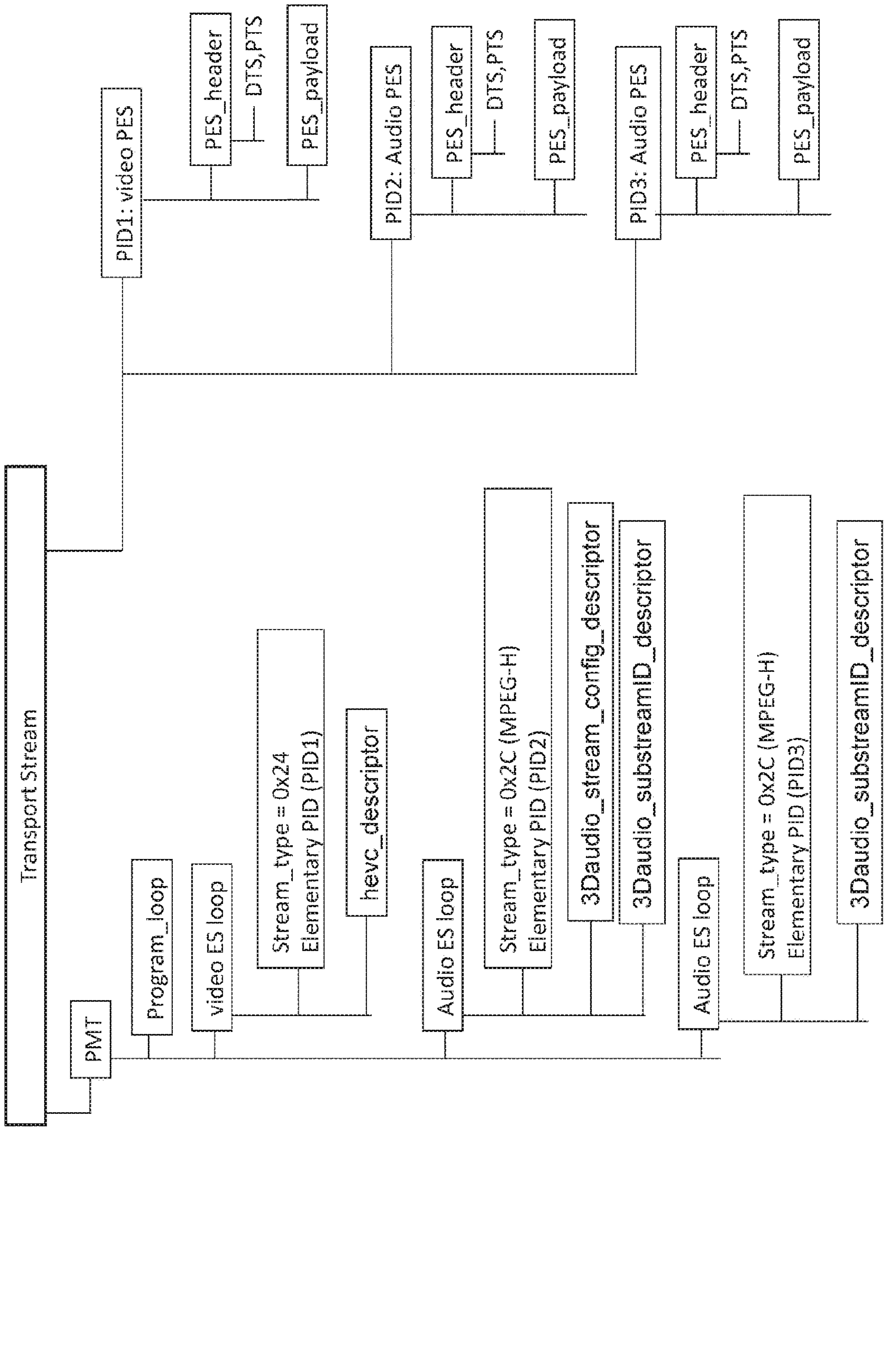
FIG. 13 is a diagram showing an example configuration of a transport stream.

FIG. 13 shows an example configuration of a transport stream TS. The example configuration corresponds to a case in which transmission is performed in two streams of the 3D audio transmission data (see FIG. 7). In the example configuration, there exists a video stream PES packet "video PES" identified by PID1. In addition, in the example configuration, there exist two audio stream (audio sub stream) PES packets "audio PESs" respectively identified by PID2, PID3. The PES packet consists of a PES header (PES_header) and a PES payload (PES_payload). In the PES header, time stamps of DTS, PTS are inserted. The time stamps of the PID2 and PID3 are appropriately attached such that the time stamps are matched each other during multiplexing, whereby synchronization between them can be ensured for the entire system.

Here, the audio stream PES packet "audio PES" identified by the PID2 includes the channel encoded data (CD) distinguished as the group 1 and the immersive audio object encoded data (IAO) distinguished as the group 2. In addition, the audio stream PES packet "audio PES" identified by the PID3 includes the speech dialog object encoded data (SDO) of the language 1 distinguished as the group 3 and the speech dialog object encoded data (SDO) of the language 2 distinguished as the group 4.

In addition, the transport stream TS includes the Program Map Table (PMT) as Program Specific Information (PSI). The PSI is information indicating a program to which each elementary stream included in the transport stream belongs. In the PMT, a program loop (Program loop) exists describing information related to the entire program.

In addition, in the PMT, an elementary stream loop exists holding information related to each elementary stream. In the example configuration, a video elementary stream loop (video ES loop) exists corresponding to the video stream, and audio elementary stream loops (audio ES loops) exist respectively corresponding to two audio streams.

In the video elementary stream loop (video ES loop), information is disposed such as a stream type, and a PID (packet identifier) corresponding to the video stream, and a descriptor is also disposed describing information related to the video stream. A value of a "Stream_type" of the video stream is set to "0×24," and the PID information indicates the PID1 given to the video stream PES packet "video PES" as described above. A HEVC descriptor is disposed as one of the descriptors.

In addition, in the audio elementary stream loop (audio ES loop), the information is disposed such as a stream type, and a PID (packet identifier) corresponding to the audio stream, and a descriptor is also disposed describing information related to the audio stream. A value of a "Stream_type" of the audio stream is set to "0×2C," and the PID information indicates the PID2 given to the audio stream PES packet "audio PES" as described above.

In the audio elementary stream loop (audio ES loop) corresponding to the audio stream identified by the PID2, both of the above-described 3D audio stream configuration descriptor and the 3D audio sub stream ID descriptor are disposed. In addition, in the audio elementary stream loop (audio ES loop) corresponding to the audio stream identified by the PID2, only the above described 3D audio sub stream ID descriptor is disposed.

[Example Configuration of Service Receiver]

Figure 14:
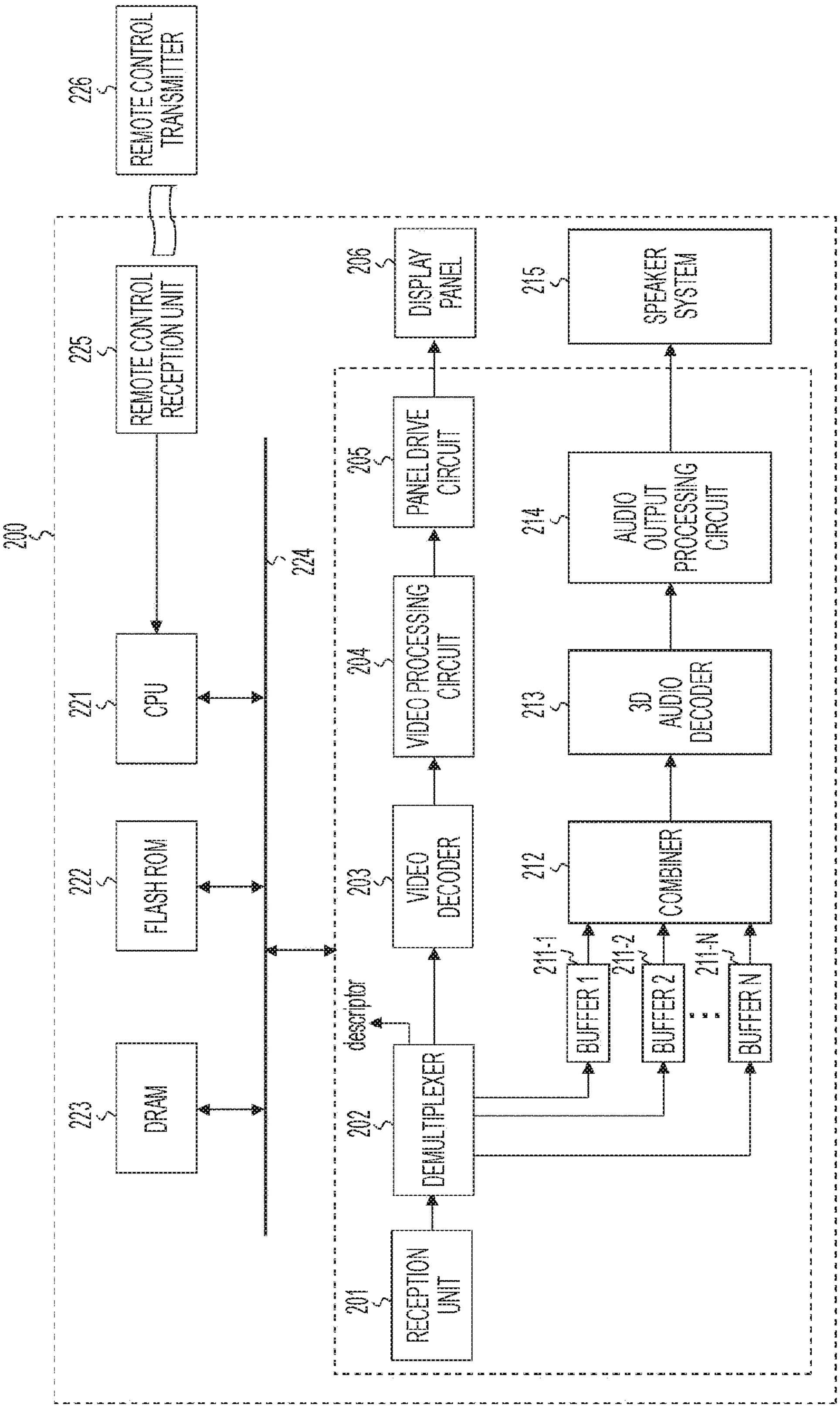
FIG. 14 is a block diagram showing an example configuration of a service receiver.

FIG. 14 shows an example configuration of the service receiver 200. The service receiver 200 has a reception unit 201, a demultiplexer 202, a video decoder 203, a video processing circuit 204, a panel drive circuit 205, and a display panel 206. In addition, the service receiver 200 has multiplexing buffers 211-1 to 211-N, a combiner 212, a 3D audio decoder 213, an audio output processing circuit 214, and a speaker system 215. In addition, the service receiver 200 has a CPU 221, a flash ROM 222, a DRAM 223, an internal bus 224, a remote control reception unit 225, and a remote control transmitter 226.

The CPU 221 controls operation of each unit of the service receiver 200. The flash ROM 222 stores control software and keeps data. The DRAM 223 configures a work area of the CPU 221. The CPU 221 deploys the software and data read from the flash ROM 222 on the DRAM 223 and activates the software to control each unit of the service receiver 200.

The remote control reception unit 225 receives a remote control signal (remote control code) transmitted from the remote control transmitter 226, and supplies the signal to the CPU 221. The CPU 221 controls each unit of the service receiver 200 on the basis of the remote control code. The CPU 221, the flash ROM 222, and the DRAM 223 are connected to the internal bus 224.

The reception unit 201 receives the transport stream TS loaded on the broadcast wave or the network packet and transmitted from the service transmitter 100. The transport stream TS has the predetermined number of audio streams including the plurality of group encoded data configuring the 3D audio transmission data, besides the video stream.

The demultiplexer 202 extracts a video stream packet from the transport stream TS and transmits the packet to the video decoder 203. The video decoder 203 reconfigures the video stream from the video packet extracted by the demultiplexer 202, and performs decoding processing to obtain uncompressed video data.

The video processing circuit 204 performs scaling processing, image quality adjustment processing, and the like to the video data obtained by the video decoder 203, and obtains video data for display. The panel drive circuit 205 drives the display panel 206 on the basis of image data for display obtained by the video processing circuit 204. The display panel 206 is configured by, for example, a Liquid Crystal Display (LCD), an organic electroluminescence (EL) display.

In addition, the demultiplexer 202 extracts information such as various descriptors from the transport stream TS, and transmits the information to the CPU 221. The various descriptors include the above-described 3D audio stream configuration descriptor (3Daudio_stream_config_descriptor) and 3D audio sub stream ID descriptor (3Daudio_substreamID_descriptor) (see FIG. 13).

The CPU 221 recognizes an audio stream including the group encoded data holding the attribute conforming to the speaker configuration and viewer (user) selection information, on the basis of the attribute information indicating the attribute of each of the group encoded data, stream relationship information indicating the audio stream (sub stream) including each group, and the like included in these descriptors.

In addition, the demultiplexer 202 selectively extracts by a PID filter one or multiple audio stream packets including the group encoded data holding the attribute conforming to the speaker configuration and viewer (user) selection information, of the predetermined number of audio streams included in the transport stream TS, under the control of the CPU 221.

The multiplexing buffers 211-1 to 211-N respectively take in the audio streams extracted by the demultiplexer 202. Here, the number N of multiplexing buffers 211-1 to 211-N is a necessary and sufficient number, and the number of audio streams extracted by the demultiplexer 202 is used, in actual operation.

The combiner 212 reads the audio stream for each audio frame from each of the multiplexing buffers respectively taking in the audio streams extracted by the demultiplexer 202, of the multiplexing buffers 211-1 to 211-N, and supplies the audio stream to the 3D audio decoder 213 as the group encoded data holding the attribute conforming to the speaker configuration and viewer (user) selection information.

The 3D audio decoder 213 performs decoding processing to the encoded data supplied from the combiner 212, and obtains audio data for driving each speaker of the speaker system 215. Here, three cases can be considered, which are a case in which the encoded data to be subjected to the decoding processing includes only the channel encoded data, a case in which the encoded data includes only the object encoded data, and further a case in which the encoded data includes both of the channel encoded data and the object encoded data.

When decoding the channel encoded data, the 3D audio decoder 213 performs processing of downmix and upmix for the speaker configuration of the speaker system 215, and obtains the audio data for driving each speaker. In addition, when decoding the object encoded data, the 3D audio decoder 213 calculates speaker rendering (mixing ratio for each speaker) on the basis of the object information (metadata), and mixes object audio data with the audio data for driving each speaker according to the calculation result.

The audio output processing circuit 214 performs necessary processing such as D/A conversion and amplification, to the audio data for driving each speaker obtained by the 3D audio decoder 213, and supplies the audio data to the speaker system 215. The speaker system 215 includes multiple speakers of multiple channels, for example 2 channels, 5.1 channels, 7.1 channels, and 22.2 channels.

Operation of the service receiver 200 shown in FIG. 14 is now briefly described. In the reception unit 201, the transport stream TS is received loaded on the broadcast wave or the network packet and transmitted from the service transmitter 100. The transport stream TS has the predetermined number of audio streams including the plurality of group encoded data configuring the 3D audio transmission data, besides the video stream. The transport stream TS is supplied to the demultiplexer 202.

In the demultiplexer 202, the video stream packet is extracted from the transport stream TS, and supplied to the video decoder 203. In the video decoder 203, the video stream is reconfigured from the video packet extracted by the demultiplexer 202, and the decoding processing is performed, and the uncompressed video data is obtained. The video data is supplied to the video processing circuit 204.

In the video processing circuit 204, the scaling processing, the image quality adjustment processing, and the like are performed to the video data obtained by the video decoder 203, and the video data for display is obtained. The video data for display is supplied to the panel drive circuit 205. In the panel drive circuit 205, the display panel 206 is driven on the basis of the video data for display. Thus, an image is displayed corresponding to the video data for display, on the display panel 206.

In addition, in the demultiplexer 202, the information such as the various descriptors is extracted from the transport stream TS, and is transmitted to the CPU 221. The various descriptors include the 3D audio stream configuration descriptor and the 3D audio sub stream ID descriptor. In the CPU 221, the audio stream (sub stream) is recognized including the group encoded data holding the attribute conforming to the speaker configuration and viewer (user) selection information, on the basis of the attribute information, the stream relationship information, and the like included in these descriptors.

In addition, in the demultiplexer 202, the one or multiple audio stream packets are selectively extracted by the PID filter, the audio stream packets including the group encoded data holding the attribute conforming to the speaker configuration and viewer selection information, of the predetermined number of audio streams included in the transport stream TS, under the control of the CPU 221.

The audio streams extracted by the demultiplexer 202 are respectively taken in the corresponding multiplexing buffers of the multiplexing buffers 211-1 to 211-N. In the combiner 212, the audio stream is read for each audio frame from each of the multiplexing buffers respectively taking in the audio streams, and is supplied to the 3D audio decoder 213 as the group encoded data holding the attribute conforming to the speaker configuration and viewer selection information.

In the 3D audio decoder 213, the decoding processing is performed to the encoded data supplied from the combiner 212, and the audio data is obtained for driving each speaker of the speaker system 215.

Here, when the channel encoded data is decoded, the processing of downmix and upmix is performed for the speaker configuration of the speaker system 215, and the audio data is obtained for driving each speaker. In addition, when the object encoded data is decoded, the speaker rendering (mixing ratio for each speaker) is calculated on the basis of the object information (metadata), and the object audio data is mixed with the audio data for driving each speaker according to the calculation result.

The audio data for driving each speaker obtained by the 3D audio decoder 213 is supplied to the audio output processing circuit 214. In the audio output processing circuit 214, the necessary processing such as the D/A conversion and amplification is performed to the audio data for driving each speaker. Then, the audio data after the processing is supplied to the speaker system 215. Thus, an audio output is obtained corresponding to a display image on the display panel 206 from the speaker system 215.

Figure 15:
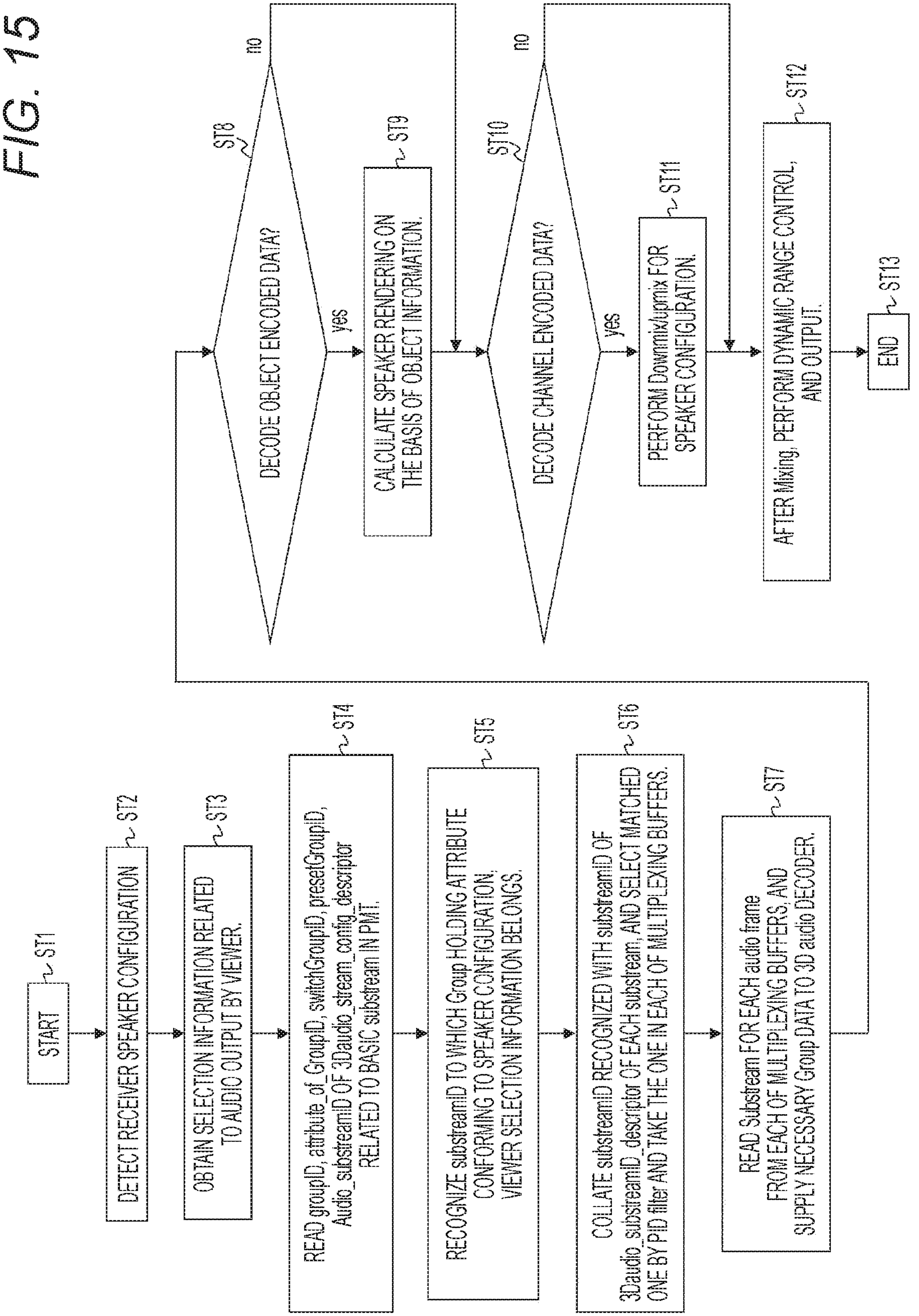
FIG. 15 is a flowchart showing an example of audio decoding control processing of a CPU in the service receiver.

FIG. 15 shows an example of audio decoding control processing of the CPU 221 in the service receiver 200 shown in FIG. 14. The CPU 221 starts the processing, in step ST1. Then, the CPU 221 detects a receiver speaker configuration, that is, the speaker configuration of the speaker system 215, in step ST2. Next, the CPU 221 obtains selection information related to an audio output by a viewer (user), in step ST3.

Next, the CPU 221 reads the "groupID," "attribute_of_GroupID," "switchGroupID," "presetGroupID," and "Audio_substreamID" of the 3D audio stream configuration descriptor (3Daudio_stream_config_descriptor), in step ST4. Then, the CPU 221 recognizes the sub stream ID (substreamID) of the audio stream (sub stream) to which the group holding the attribute conforming to the speaker configuration and viewer selection information belongs, in step ST5.

Next, the CPU 221 collates the sub stream ID (substreamID) recognized with the sub stream ID (substreamID) of the 3D audio sub stream ID descriptor (3Daudio_substreamID_descriptor) of each audio stream (sub stream), and selects a matched one by the PID filter (PID filter), and takes the one in each of the multiplexing buffers, in step ST6. Then, the CPU 221 reads the audio stream (sub stream) for each audio frame from each of the multiplexing buffers, and supplies the necessary group encoded data to the 3D audio decoder 213, in step ST7.

Next, the CPU 221 determines whether or not to decode the object encoded data, in step ST8. When decoding the object encoded data, the CPU 221 calculates the speaker rendering (mixing ratio for each speaker) by azimuth (azimuth information) and elevation (elevation information) on the basis of the object information (metadata), in step ST9. After that, the CPU 221 proceeds to step ST10. Incidentally, when not decoding the object encoded data in step ST8, the CPU 221 immediately proceeds to step ST10.

The CPU 221 determines whether or not to decode the channel encoded data, in step ST10. When decoding the channel encoded data, the CPU 221 performs the processing of downmix and upmix for the speaker configuration of the speaker system 215, and obtains the audio data for driving each speaker, in step ST11. After that, the CPU 221 proceeds to step ST12. Incidentally, when not decoding the object encoded data in step ST10, the CPU 221 immediately proceeds to step ST12.

The CPU 221 mixes the object audio data with the audio data for driving each speaker according to the calculation result in step ST9 when decoding the object encoded data, and then performs dynamic range control, in step ST12. After that, the CPU 21 ends the processing, in step ST13. Incidentally, when not decoding the object encoded data, the CPU 221 skips step ST12.

As described above, in the transmission/reception system 10 shown in FIG. 1, the service transmitter 100 inserts the attribute information indicating the attribute of each of the plurality of group encoded data included in the predetermined number of audio streams, into the layer of the container. For that reason, at the reception side, the attribute of each of the plurality of group encoded data can be easily recognized before decoding of the encoded data, and only the necessary group encoded data can be selectively decoded to be used, and the processing load can be reduced.

In addition, in the transmission/reception system 10 shown in FIG. 1, the service transmitter 100 inserts the stream correspondence information indicating the audio stream including each of the plurality of group encoded data, into the layer of the container. For that reason, at the reception side, the audio stream including the necessary group encoded data can be easily recognized, and the processing load can be reduced.

2. Modification

Incidentally, in the above-described embodiment, the service receiver 200 is configured to selectively extract the audio stream including the group encoded data holding the attribute conforming to the speaker configuration and viewer selection information, from the multiple audio streams (sub streams) transmitted from the service transmitter 100, and to perform the decoding processing to obtain the audio data for driving a predetermined number of speakers.

However, it can also be considered, as the service receiver, to selectively extract one or multiple audio streams holding the group encoded data holding the attribute conforming to the speaker configuration and viewer selection information, from the multiple audio streams (sub streams) transmitted from the service transmitter 100, to reconfigure an audio stream holding the group encoded data holding the attribute conforming to the speaker configuration and viewer selection information, and to deliver the reconfigured audio stream to a device (including a DLNA device) connected to a local network.

Figure 16:
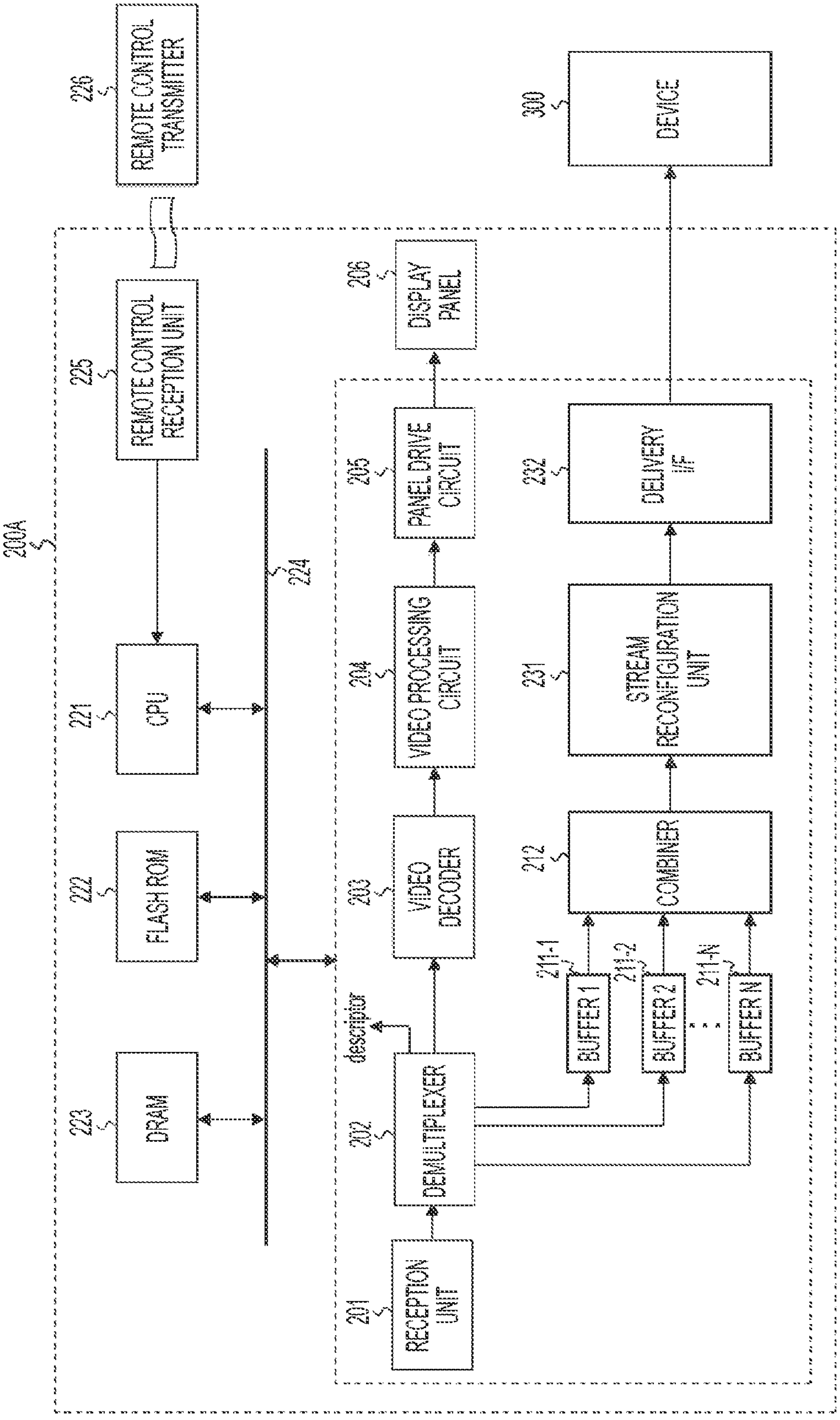
FIG. 16 is a block diagram showing another example configuration of the service receiver.

FIG. 16 shows an example configuration of a service receiver 200A for delivering the reconfigured audio stream to the device connected to the local network as described above. In FIG. 16, the components equivalent to components shown in FIG. 14 are denoted by the same reference numerals as those used in FIG. 14, and detailed explanation of them is not repeated herein.

In the demultiplexer 202, one or multiple audio stream packets are selectively extracted by the PID filter, the audio stream packets including the group encoded data holding the attribute conforming to the speaker configuration and viewer selection information, of the predetermined number of audio streams included in the transport stream TS, under the control of the CPU 221.

The audio streams extracted by the demultiplexer 202 are respectively taken in the corresponding multiplexing buffers of the multiplexing buffers 211-1 to 211-N. In the combiner 212, the audio stream is read for each audio frame from each of the multiplexing buffers respectively taking in the audio streams, and is supplied to a stream reconfiguration unit 231.

In the stream reconfiguration unit 231, the predetermined group encoded data is selectively acquired holding the attribute conforming to the speaker configuration and viewer selection information, and the audio stream is reconfigured holding the predetermined group encoded data. The reconfigured audio stream is supplied to a delivery interface 232. Then, the delivery (transmission) is performed from the delivery interface 232 to a device 300 connected to the local network.

The local network connection includes Ethernet connection, and wireless connection such as "WiFi" or "Bluetooth." Incidentally, "WiFi" and "Bluetooth" are registered trademarks.

In addition, the device 300 includes a surround speaker, a second display, and an audio output device attached to a network terminal. The device 300 receiving delivery of the reconfigured audio stream performs the decoding processing similar to that of the 3D audio decoder 213 in the service receiver 200 of FIG. 14, and obtains the audio data for driving the predetermined number of speakers.

In addition, as the service receiver, a configuration can also be considered in which the above-described reconfigured audio stream is transmitted to a device connected via a digital interface such as "High-Definition Multimedia Interface (HDMI)," "Mobile High definition Link (MHL)", or "DisplayPort." Incidentally, "HDMI" and "MHL" are registered trademarks.

In addition, in the above-described embodiment, the stream correspondence information inserted into the layer of the container is the information indicating a correspondence between the group ID and the sub stream ID. That is, the sub stream ID is used for associating the group and the audio stream (sub stream) with each other. However, it can also be considered to use the packet identifier (Packet ID: PID) or the stream type (stream_type) for associating the group and the audio stream (sub stream) with each other. Incidentally, when the stream type is used, it is necessary to change the stream type of each audio stream (sub stream).

In addition, in the above-described embodiment, an example has been shown in which the attribute information of each of the group encoded data is transmitted by providing the field of the "attribute_of_groupID" (see FIG. 10). However, the present technology includes a method in which the type (attribute) of the encoded data can be recognized when a specific group ID is recognized, by defining a special meaning for a value of the group ID (GroupID) itself between the transmitter and the receiver. In this case, the group ID functions as group identifier, and also functions as the attribute information of the group encoded data, so that the field of the "attribute_of_groupID" is unnecessary.

In addition, in the above-described embodiment, an example has been shown in which the plurality of group encoded data includes both of the channel encoded data and the object encoded data (see FIG. 3). However, the present technology can be applied similarly also to a case in which the plurality of group encoded data includes only the channel encoded data, or includes only the object encoded data.

In addition, in the above-described embodiment, an example has been shown in which the container is the transport stream (MPEG-2 TS). However, the present technology can be applied similarly also to a system in which delivery is performed by the container of MP4 or another format. For example, it is an MPEG-DASH based stream delivery system, or a transmission/reception system dealing with an MPEG Media Transport (MMT) structure transmission stream.

Incidentally, the present technique may also be embodied in the structures described below.

(1) A transmission device including:

a transmission unit for transmitting a predetermined format container having a predetermined number of audio streams including a plurality of group encoded data; and an information insertion unit for inserting attribute information indicating an attribute of each of the plurality of group encoded data, into a layer of the container.

(2) The transmission device according to the (1), wherein the information insertion unit further inserts stream correspondence information indicating an audio stream including each of the plurality of group encoded data, into the layer of the container.

(3) The transmission device according the (2), wherein the stream correspondence information is information indicating a correspondence between a group identifier for identifying each of the plurality of group encoded data and a stream identifier for identifying each of the predetermined number of audio streams.

(4) The transmission device according to the (3), wherein the information insertion unit further inserts stream identifier information indicating a stream identifier of each of the predetermined number of audio streams, into the layer of the container.

(5) The transmission device according to the (4), wherein the container is an MPEG2-TS, and the information insertion unit inserts the stream identifier information into an audio elementary stream loop corresponding to each of the predetermined number of audio streams existing under a program map table.

(6) The transmission device according the (2), wherein the stream correspondence information is information indicating a correspondence between the group identifier for identifying each of the plurality of group encoded data and a packet identifier to be attached during packetizing of each of the predetermined number of audio streams.

(7) The transmission device according the (2), wherein the stream correspondence information is information indicating a correspondence between the group identifier for identifying each of the plurality of group encoded data and type information indicating a stream type of each of the predetermined number of audio streams.

(8) The transmission device according to any of the (2) to (7), wherein the container is an MPEG2-TS, and the information insertion unit inserts the attribute information and the stream correspondence information, into an audio elementary stream loop corresponding to any one audio stream of the predetermined number of audio streams existing under the program map table.

(9) The transmission device according to any of the (1) to (8), wherein the plurality of group encoded data includes either or both of channel encoded data and object encoded data.

(10) A transmission method including:

a transmission step for transmitting a predetermined format container having a predetermined number of audio streams including a plurality of group encoded data, from a transmission unit; and an information insertion step for inserting attribute information indicating an attribute of each of the plurality of group encoded data, into a layer of the container.

(11) A reception device including:

a reception unit for receiving a predetermined format container having a predetermined number of audio streams including a plurality of group encoded data, attribute information indicating an attribute of each of the plurality of group encoded data being inserted into a layer of the container; and a processing unit for processing the predetermined number of audio streams included in the container received, on the basis of the attribute information.

(12) The reception device according to the (11), wherein stream correspondence information indicating an audio stream including each of the plurality of group encoded data is further inserted into the layer of the container, and the processing unit processes the predetermined number of audio streams on the basis of the stream correspondence information, besides the attribute information.

(13) The reception device according to the (12), wherein the processing unit selectively performs decoding processing to an audio stream including group encoded data holding an attribute conforming to a speaker configuration and user selection information, on the basis of the attribute information and the stream correspondence information.

(14) The reception device according to any of the (11) to (13), wherein the plurality of group encoded data includes either or both of channel encoded data and object encoded data.

(15) A reception method including:

a reception step for receiving a predetermined format container having a predetermined number of audio streams including a plurality of group encoded data, by a reception unit, attribute information indicating an attribute of each of the plurality of group encoded data being inserted into a layer of the container; and a processing step for processing the predetermined number of audio streams included in the container received, on the basis of the attribute information.

(16) A reception device including:

a reception unit for receiving a predetermined format container having a predetermined number of audio streams including a plurality of group encoded data, attribute information indicating an attribute of each of the plurality of group encoded data being inserted into a layer of the container;

a processing unit for selectively acquiring predetermined group encoded data on the basis of the attribute information from the predetermined number of audio streams included in the container received, and reconfiguring an audio stream including the predetermined group encoded data; and a stream transmission unit for transmitting the audio stream reconfigured in the processing unit to an external device.

(17) The reception device according to the (16), wherein stream correspondence information indicating an audio stream including each of the plurality of group encoded data is further inserted into the layer of the container, and the processing unit selectively acquires the predetermined group encoded data from the predetermined number of audio streams on the basis of the stream correspondence information, besides the attribute information.

(18) A reception method including:

a reception step for receiving a predetermined format container having a predetermined number of audio streams including a plurality of group encoded data, by a reception unit, attribute information indicating an attribute of each of the plurality of group encoded data being inserted into a layer of the container;

a processing step for selectively acquiring predetermined group encoded data on the basis of the attribute information from the predetermined number of audio streams included in the container received, and reconfiguring an audio stream including the predetermined group encoded data; and a stream transmission step for transmitting the audio stream reconfigured in the processing step to an external device.

The main feature of the present technology is that the processing load of the reception side can be reduced by inserting the attribute information indicating the attribute of each of the plurality of group encoded data included in the predetermined number of audio streams and the stream correspondence information indicating the audio stream including each of the plurality of group encoded data, into the layer of the container (see FIG. 13).

REFERENCE SIGNS LIST

10 Transmission/reception system
100 Service transmitter
110 Stream generation unit
112 Video encoder
113 Audio encoder
114 Multiplexer
200, 200A Service receiver
201 Reception unit
202 Demultiplexer
203 Video decoder
204 Video processing circuit
205 Panel drive circuit
206 Display panel
211-1 to 211-N Multiplexing buffer
212 Combiner
213 3D audio decoder
214 Audio output processing circuit
215 Speaker system
221 CPU
222 Flash ROM
223 DRAM
224 Internal bus
225 Remote control reception unit
226 Remote control transmitter
231 Stream reconfiguration unit
232 Delivery interface
300 Device

The invention claimed is:

1. A transmission device comprising:

processing circuitry configured to:

generate a container, the container including a plurality of audio streams for carrying a plurality of groups of encoded data, each audio stream of the plurality of audio streams including one or more groups from the plurality of groups of encoded data; and insert a configuration descriptor into the container, the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier; and transmission circuitry configured to transmit the container.

2. The transmission device according to claim 1, wherein the container is an MPEG2-TS, and the processing circuitry is further configured to insert a plurality of audio stream identifiers identifying the plurality of audio streams into audio elementary stream loops under a program map table, the audio elementary stream loops variously corresponding to the plurality of audio streams.

3. The transmission device according to claim 1, wherein the processing circuitry is further configured to insert, into the container, packet identifiers in association with the plurality of audio streams, respectively, the packet identifiers being attached to various packets during packetizing of respective ones of the plurality of audio streams.

4. The transmission device according to claim 1, wherein the processing circuitry is further configured to insert, into the container, type information indicating stream types of the plurality of audio streams.

5. The transmission device according to claim 1, wherein the container is an MPEG2-TS, and the processing circuitry is configured to insert the configuration descriptor into an audio elementary stream loop under a program map table, the audio elementary stream loop corresponding to a main audio stream.

6. The transmission device according to claim 1, wherein the plurality of groups of encoded data includes either or both of channel encoded data and object encoded data.

7. A transmission method comprising:

generating, by processing circuitry of a transmission device, a container, the container including a plurality of audio streams for carrying a plurality of groups of encoded data, each audio stream of the plurality of audio streams including one or more groups from the plurality of groups of encoded data;

inserting, by the processing circuitry, a configuration descriptor into the container, the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier; and transmitting the container by transmission circuitry of the transmission device.

8. A reception device comprising:

reception circuitry configured to receive a container, the container including a plurality of audio streams for carrying a plurality of groups of encoded data and a configuration descriptor, each audio stream of the plurality of audio streams including one or more groups from the plurality of groups of encoded data, and the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier; and processing circuitry configured to process the plurality of audio streams for acoustic reproduction of a collection of groups of encoded data from the plurality of groups of encoded data on the basis of the configuration descriptor.

9. The reception device according to claim 8, wherein the processing circuitry is configured to selectively perform decoding processing on a portion of the plurality of the audio streams conforming to a speaker configuration and user selection information, on the basis of the configuration descriptor.

10. The reception device according to claim 8, wherein the plurality of groups of encoded data includes either or both of channel encoded data and object encoded data.

11. A reception method comprising:

receiving, by reception circuitry of a reception device, a container, the container including a plurality of audio streams for carrying a plurality of groups of encoded data and a configuration descriptor, each audio stream of the plurality of audio streams including one or more groups from the plurality of groups of encoded data, and the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier; and processing, by processing circuitry of the reception device, the plurality of audio streams for acoustic reproduction of a collection of groups of encoded data from the plurality of groups of encoded data on the basis of the configuration descriptor.

12. A reception device comprising:

reception circuitry configured to receive a container, the container including a plurality of audio streams for carrying a plurality of groups of encoded data and a configuration descriptor, each audio stream of the plurality of audio streams including one or more groups from the plurality of groups of encoded data, and the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier; and processing circuitry configured to acquire a collection of groups of encoded data on the basis of the configuration descriptor from the plurality of audio streams included in the received container, and generate an output audio stream including the collection of groups of encoded data; and transmission circuitry configured to transmit the generated output audio stream to an external device.

13. A reception method comprising:

receiving, by reception circuitry of a reception device, a container, the container including a plurality of audio streams for carrying a plurality of groups of encoded data and a configuration descriptor, each audio stream of the plurality of audio streams including one or more groups from the plurality of groups of encoded data, and the configuration descriptor including a plurality of pieces of group information, each piece of the pieces of group information being processed in a for loop and indicating a correspondence between a corresponding group of encoded data from the groups of encoded data and an audio stream of the plurality of audio streams that includes the corresponding group, by including (i) a group identifier identifying the corresponding group of encoded data from the plurality of groups of encoded data, (ii) an audio stream identifier identifying the audio stream of the plurality of audio streams in which the corresponding group of encoded data is included, and (iii) an audio sub-stream identifier;

acquiring, by processing circuitry of the reception device, a collection of groups of encoded data on the basis of the configuration descriptor from the plurality of audio streams included in the received container;

generating, by the processing circuitry, an output audio stream including the collection of groups of encoded data; and transmitting, by transmission circuitry of the reception device, the generated output audio stream to an external device.

14. The transmission device according to claim 1, wherein one of the audio streams corresponds to a most basic stream of the plurality of audio streams.

15. The transmission device according to claim 1, wherein the configuration descriptor further includes a data field indicating a number of preset collections of groups of encoded data included in the container.

16. The transmission method according to claim 7, wherein one of the audio streams corresponds to a most basic stream of the plurality of audio streams.

17. The transmission method according to claim 7, wherein the configuration descriptor further includes a data field indicating a number of preset collections of groups of encoded data included in the container.

18. The transmission device according to claim 1, wherein the configuration descriptor further includes a data field indicating a number of the pieces of group information arranged one after another after the data field in the configuration descriptor.

19. The reception device according to claim 8, wherein the configuration descriptor further includes a data field indicating a number of the pieces of group information arranged one after another after the data field in the configuration descriptor.

* * * * *